United States Patent [19]
Laible

[11] Patent Number: 5,890,517
[45] Date of Patent: Apr. 6, 1999

[54] VENTED QUICK DISCONNECT COUPLING

[76] Inventor: Rodney Laible, R.R. 1, Box 37, Bennington, Nebr. 68007

[21] Appl. No.: 963,796

[22] Filed: Nov. 4, 1997

[51] Int. Cl.⁶ .................................................. F16L 37/28
[52] U.S. Cl. ..................................... 137/614.04; 137/614
[58] Field of Search ............................... 137/614.04, 614

[56] References Cited

U.S. PATENT DOCUMENTS

| | | | |
|---|---|---|---|
| H1272 | 1/1994 | Machado et al. ....................... | 285/315 |
| 2,648,553 | 8/1953 | Ulrich ..................................... | 285/178 |
| 3,243,071 | 3/1966 | Kimmel ................................... | 215/56 |
| 3,422,844 | 1/1969 | Grise ...................................... | 137/525.1 |
| 3,674,061 | 7/1972 | Calisher et al. ......................... | 141/198 |
| 3,777,771 | 12/1973 | De Visscher ........................ | 137/614.04 |
| 3,825,222 | 7/1974 | Petrova ................................. | 251/149.6 |
| 4,095,713 | 6/1978 | Norton ................................... | 220/270 |
| 4,160,383 | 7/1979 | Rauschenberger ....................... | 73/422 |
| 4,249,670 | 2/1981 | Hug ........................................ | 220/295 |
| 4,436,125 | 3/1984 | Blenkush ................................ | 141/330 |
| 4,548,344 | 10/1985 | Hestehave et al. ...................... | 222/464 |
| 4,741,368 | 5/1988 | Crumby ................................. | 141/18 |
| 5,165,578 | 11/1992 | Laible .................................... | 137/859 |
| 5,172,723 | 12/1992 | Sturgis ................................... | 137/613 |
| 5,215,128 | 6/1993 | Neeser .................................... | 141/59 |
| 5,215,538 | 6/1993 | Larkin .................................... | 604/249 |
| 5,277,225 | 1/1994 | Smith ................................. | 137/614.04 |
| 5,316,041 | 5/1994 | Ramacier, Jr. et al. ........... | 137/614.04 |
| 5,348,048 | 9/1994 | Schirado et al. ....................... | 137/588 |
| 5,445,358 | 8/1995 | Anderson ............................. | 251/149.6 |
| 5,451,031 | 9/1995 | Purvis et al. ........................... | 251/89.5 |

FOREIGN PATENT DOCUMENTS

| | | | |
|---|---|---|---|
| 2712117 | 9/1978 | Germany .......................... | 137/614.04 |

Primary Examiner—A. Michael Chambers
Attorney, Agent, or Firm—Zarley,McKee, Thomte, Voorhees & Sease; Dennis L. Thomte

[57] ABSTRACT

A vented quick disconnect coupling includes male and female coupling members, each including a valve which is situated and constructed to automatically open upon coupling of the members together and automatically close upon uncoupling of the members to eliminate spilling or leakage from either coupling member. The valves are constructed to afford a fluid tight seal without any O-ring seals. Likewise, the valves are situated at the joining ends of the coupling members to eliminate fluid loss when the coupling members are separated. At least one of the coupling members enables venting of gas from a fluid container on which it is mounted to dispel positive or negative pressure differentials relative to the atmosphere while precluding liquid flow therethrough.

18 Claims, 5 Drawing Sheets

VENTED QUICK DISCONNECT COUPLING

BACKGROUND OF THE INVENTION

1. Technical Field

The present invention is directed generally to a quick disconnect coupling and more particularly to such a coupling wherein both the male and female coupling members include valves for automatic closure upon uncoupling and gas pressure differential venting is provided for between the atmosphere and the container onto which the coupling is mounted.

2. Description of the Prior Art

Quick disconnect couplings for liquid flow conduits such as pipes and hoses are known and commercially available. Examples include the quick disconnect couplings of U.S. Pat. Nos. 4,436,125 and 5,316,041 of Colder Products Company. One or more of the following problems are associated with all of the known quick disconnect couplings, thereby limiting their effectiveness.

First, many of the couplings include O-ring seals which tend to wear and leak in response to repeated coupling and uncoupling cycles or in response to the action of liquid chemicals to which they may be exposed. The inconvenience and expense of monitoring the age and condition of such O-ring seals places an impractical burden on users and creates an exposure to risk of leakage from unmonitored couplings. Such O-rings generally require an interruption between the engaged surfaces of the coupling members, thereby reducing the stability of the coupling and increasing the chances for leakage.

Secondly, a failure to provide an automatically actuated valved closure on both halves of the coupling member creates risk of leakage, upon disconnection of the coupling halves, from either of the fluid conduits or containers to which the coupling halves are connected.

Thirdly, a substantial space between the closure valves in the coupling halves creates the risk of spillage of any liquid situated between the valves upon disconnection of the coupling halves.

Finally, a lack of atmospheric venting through at least one of the coupling halves limits their effectiveness for use on fluid containers in which positive or negative pressure differentials are created either by the fluids themselves or by the action of filling the container or dispensing fluid therefrom. Lack of adequate venting causes safety and quality concerns because negative pressure within a fluid container interferes with dispensing of the fluids by the metering guns which are in common use. Likewise, negative pressure may cause collapsing of a bottle which can result in a toppling over. It is also important that any venting system be spaced sufficiently from the liquid flow into and from a container that the venting gases are not drawn into the liquid stream.

Accordingly, a primary object of the invention is to provide an improved quick disconnect coupling.

Another object is to provide an effective vented quick disconnect coupling.

Another object is to provide a quick disconnect coupling with valves on both coupling members which are automatically closed upon uncoupling.

Another object is to provide a quick disconnect coupling having automatic closure valves situated closely adjacent the engaged ends of the coupling members to minimize and eliminate any free fluid between them upon uncoupling of the coupling members.

Another object is to provide a quick disconnect coupling which minimizes or eliminates O-ring seals.

Another object is to provide a quick disconnect coupling adapted for use on any liquid container including, but not limited to, pails, jars, vials and bottles.

Another object is to provide a quick disconnect coupling in which the seals are not subject to chemical erosion.

Another object is to provide a quick disconnect coupling which maximizes surface engagement between the coupling members for maximum stability and elimination of leakage.

Another object is to provide a quick disconnect coupling which affords a visual indication of whether the coupling members are locked together.

Another object is to provide a quick disconnect coupling with effective venting for accurate dispensing of liquid from a container on which the coupling is mounted.

Another object is to provide a quick disconnect coupling with effective venting which enables usage on thinner walled and less expensive containers.

Finally, an object is to provide a quick disconnect coupling which is simple and rugged in construction, economical to manufacture and efficient in operation.

SUMMARY OF THE INVENTION

The vented quick disconnect coupling of the present invention includes what will be referred to as a male coupling member and a female coupling member. The male coupling member includes a generally tubular tower having a first valve seat adjacent the free end of the tower and defining a first opening for fluid flow therethrough. A first valve member reciprocates within the tower between a valve closed position in engagement with the first valve seat wherein fluid flow through the first opening is blocked, and a valve closed position in spaced relation from the first valve seat whereby fluid is free to flow through the first opening. A biasing apparatus, such as a spring, urges the first valve member to the valve closed position. A first connector is provided on opposite connected end of the tubular tower for connection to a fluid carrier such as a hose, pipe or container.

The female coupling member includes a tubular valve body having a second valve seat adjacent the free end of the valve body and defining a second opening. A second valve member reciprocates within the valve body between a valve closed position in engagement with the second valve seat wherein fluid flow through the second opening is blocked, and a valve open position in spaced relation from the second valve seat whereby fluid is free to flow through the second opening. A second biasing apparatus such as a spring urges the second valve member to the valve closed position. Likewise, a second connector on the opposite connected end of the tubular valve body is operative for connecting the female coupling member to a second fluid carrier such as a hose, pipe or liquid container.

Co-acting first and second valve actuators are provided on the first and second valve members, respectively. These are positioned for extension through the first and second openings for mutual engagement with one another. The combined length of the actuators is such that, upon receipt of the tubular tower of the male coupling member into the valve body of the female coupling member to a coupled position, both of the first and second valve members are moved to the valve open positions thereof against the urging of the first and second biasing apparatus.

At least one of the male and female coupling members includes a system for establishing venting of gas, but not liquid, between the atmosphere and a fluid carrier or container onto which that coupling member is mounted. The venting system is preferably incorporated into a bottle cap having a top wall with an opening registered with either the tubular tower or tubular valve member for fluid flow therebetween. A liquid flow control insert has a raised flow control portion adapted for insertion through the top wall opening and a base portion having a raised peripheral flange and at least one vent opening therethrough. An annular seal is disposed between the cap top wall and flow control insert. The seal is of a design or material which is operative to allow air, but not liquid, to pass through it. The top wall has at least one vent opening to enable venting of gases through the base portion of the flow control insert, the seal and the cap top wall.

A preferred form of valve for the male and female coupling members has one of the first valve seat and first valve member in the form of a first protruding collar and the other of the first valve seat and first valve member in the form of a first collar receiving channel of a size and position for receiving the first collar in fluid tight relation upon movement of the first valve member to the valve closed position. A similar valve is preferably included in the female coupling member.

To secure the male and female coupling members in their coupled position, the tubular tower of the male coupling member has an exteriorly facing lock socket formed in the peripheral sidewall thereof. The female coupling member has a lock slot through the power receiving sleeve at a position for registration with the lock socket upon receipt of the tubular tower to the coupled position. A lock member situated within the lock slot is movable between a lock position protruding interiorly of the tower receiving sleeve for receipt within the lock socket and an unlocked position protruding exteriorly of the tower receiving sleeve. A locking sleeve surrounds the tower receiving sleeve and is axially slidable between locked and unlocked positions. The locking sleeve has a reduced diameter portion which is registered with the lock members in the locked position of the locking sleeve for securing the lock member in the lock position. It also has an enlarged diameter portion registered with the lock member in the unlocked position of the locking sleeve for enabling movement of the lock member to the unlocked position thereof for uncoupling the male and female coupling members.

DESCRIPTION OF THE PREFERRED EMBODIMENT

Figure 2:
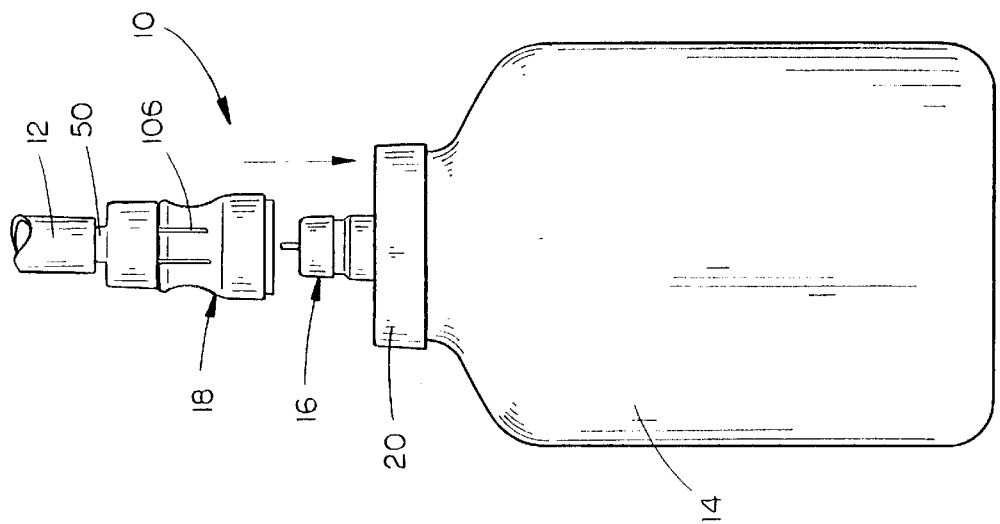
FIG. 2 is an enlarged, foreshortened side elevational view of the coupling, hose and container of FIG. 1 but with the male and female coupling members disconnected.
Figure 1:
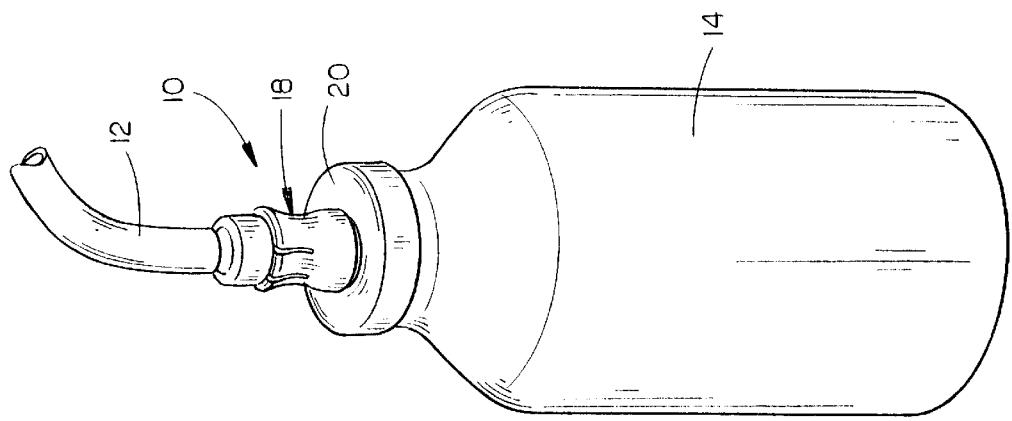
FIG. 1 is a perspective view of the vented quick disconnect coupling connecting a hose to a liquid container.

The vented quick disconnect coupling 10 of the present invention is illustrated in FIG. 1 coupling a supply hose 12 to a bottle 14. Referring to FIG. 2, it is seen that the quick disconnect coupling 10 includes a male coupling member 16 and a female coupling member 18. The illustrated quick disconnect coupling 10 has the male coupling member 16 mounted on the cap 20 of bottle 14 and the female coupling member 18 connected to the supply hose 12. Either coupling member can be modified for connection to any type of fluid carrier, as discussed below.

Figure 3:
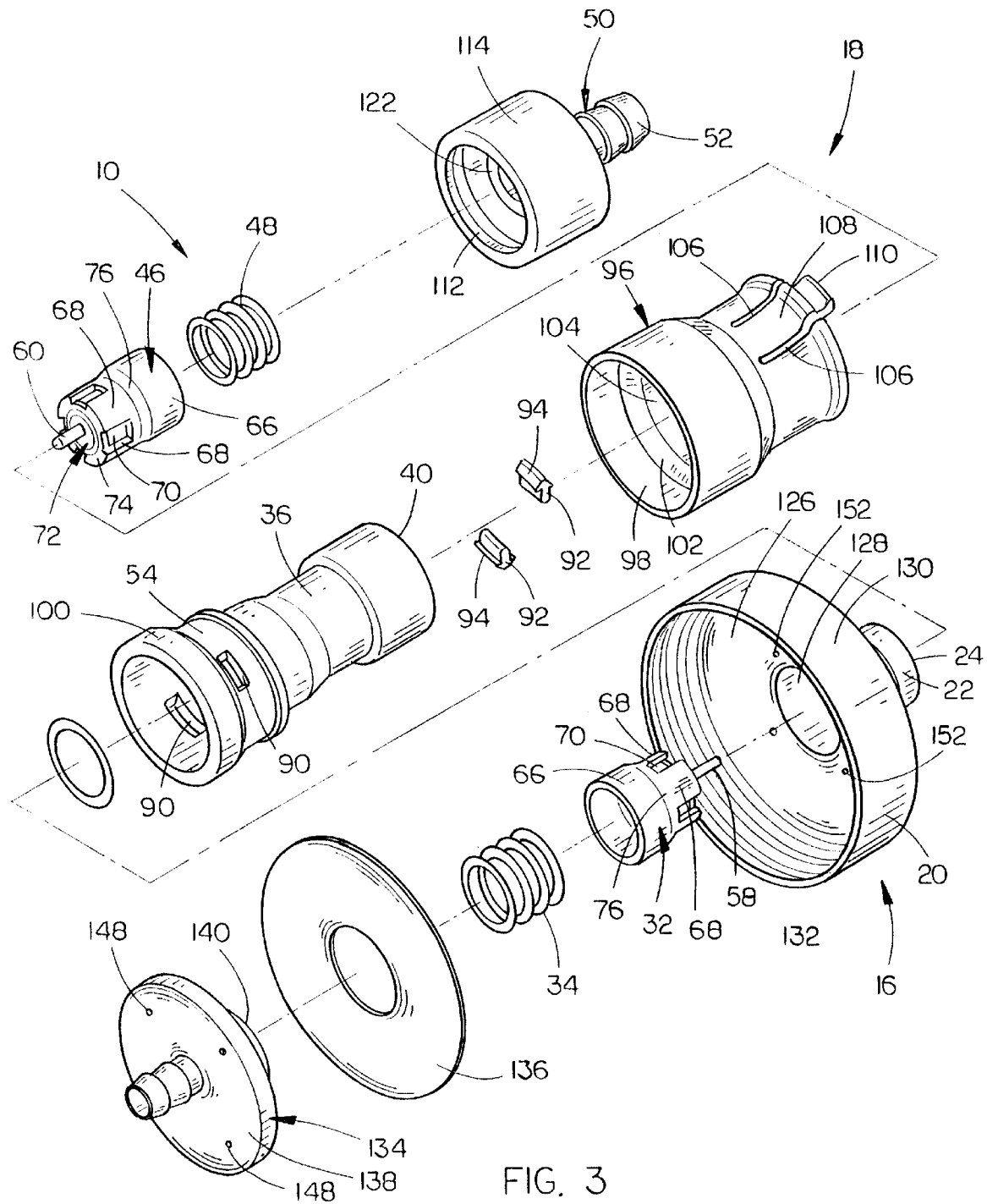
FIG. 3 is an exploded perspective view of the parts of the vented quick disconnect coupling of the invention.
Figure 4:
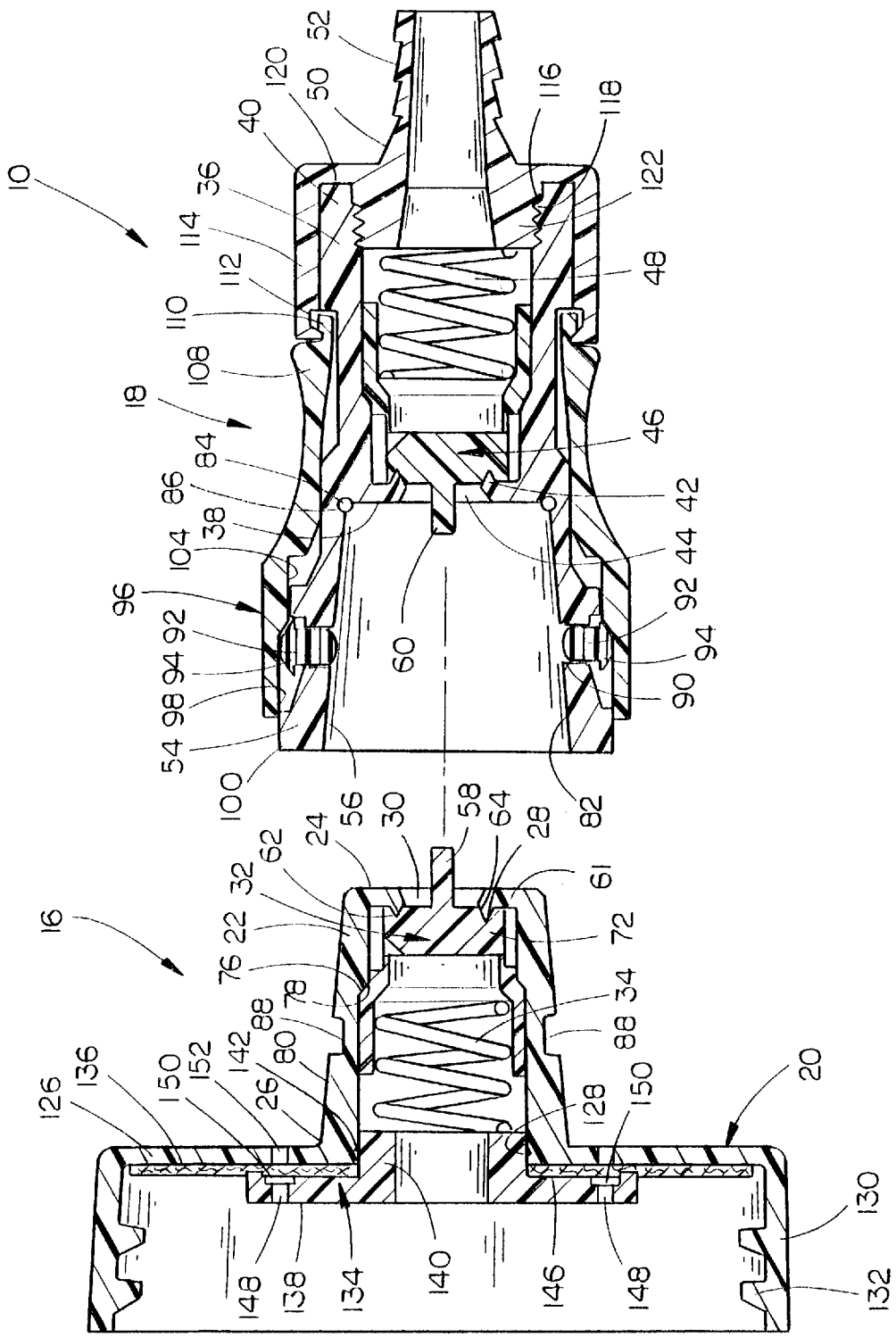
FIG. 4 is an enlarged side sectional view of the male and female coupling members in disconnected, uncoupled positions.
Figure 5:
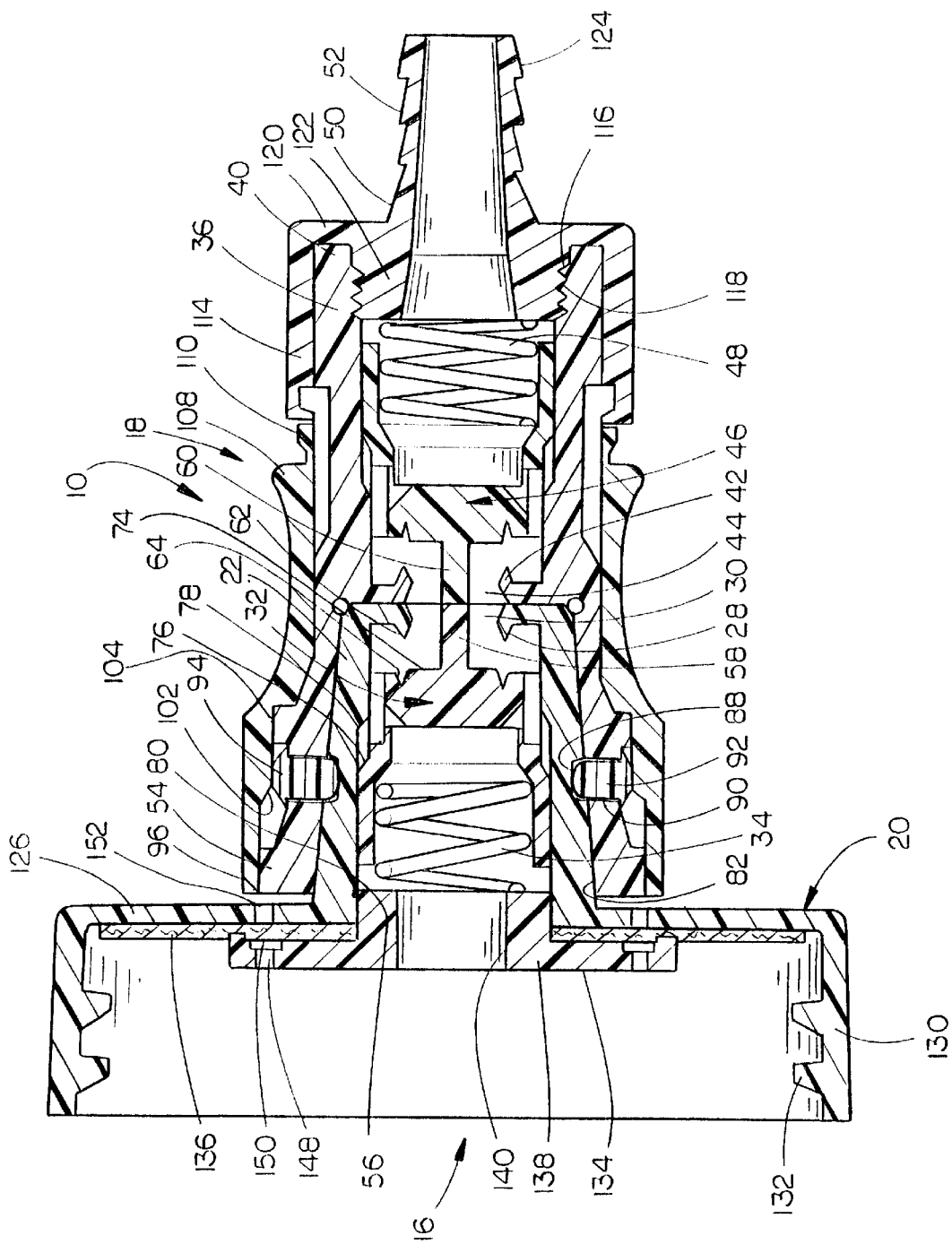
FIG. 5 is a further enlarged side sectional view showing the male and female coupling members in their coupled positions with the lock sleeve moved to the lock position.

The construction of the quick disconnect coupling 10 is shown in FIGS. 3–5. FIG. 3 is an exploded view of the various parts whereas FIGS. 4 and 5 show the assembled male coupling member 16 and female coupling member 18 in uncoupled and coupled positions, respectively.

The male coupling member includes a generally tubular tower 22 having a free end 24 and a connected end 26. A first valve seat 28 is situated at or closely adjacent the free end 24 of tower 22 and defines a first opening 30 through it. A first valve member 32 is reciprocally and axially movable within the tower 22 between the valve closed position shown in FIG. 4 and the valve open position shown in FIG. 5. In the valve closed position of FIG. 4, the first valve member 32 blocks fluid flow through the first opening 30 whereas in the valve open position in FIG. 5, fluid is free to flow through the first opening 30. A compression spring 34 or any other suitable biasing apparatus urges the first valve member 32 to its valve closed position of FIG. 4. In the illustrated embodiment, cap 14 is integrally formed with the tower 22 to serve as the connector on the connected end 26 of the tower for connecting it to a fluid carrier such as the bottle 14 shown in FIGS. 1 and 2.

The female coupling member 18 includes a tubular valve body 36, likewise having a free end 38 and a connected end 40. The tubular valve body 36 likewise has a second valve seat 42 at or closely adjacent the free end 38, which valve seat defines a second opening 44 for fluid flow through it. A second valve member 46 is reciprocally and axially movable within the tubular valve body 36 between the valve closed position shown in FIG. 4 and the valve open position shown in FIG. 5. In the valve closed position in FIG. 4, the second valve member engages the second valve seat 42 and blocks fluid flow through the second opening 44. In the valve open position in FIG. 5, the second valve member 46 is spaced from the second valve seat 42 so that fluid is free to flow through the second opening 44. A second spring or other biasing apparatus is situated within the valve body 36 to urge the second valve member 46 to its closed position of FIG. 4. A second connector 50 provides a hose barb insert 52 for connecting the tubular valve body 36 to a second fluid carrier such as the supply hose shown in FIGS. 1 and 2.

The tubular valve body 36 is preferably integrally formed with a tower receiving sleeve 54 axially protruding from the free end 38 of the valve body 36 and defining an interior socket 56 of a size and shape for receiving the tubular tower 22 of the male coupling member 16 to a substantially fluid tight coupled position as shown in FIG. 5.

An important feature of the present invention is the first and second valve actuators 58 and 60 on the first and second valve members 32 and 46, respectively. These are positioned for extension through the first and second openings 30 and 44, respectively, for engaging one another. The combined length of the actuators 58 and 60 is such that, upon receipt of the tubular tower 22 into the valve body 36 to the coupled position thereof, both of the first and second valve members 32 and 46 are moved to the valve open positions thereof against the urging of the respective first and second springs 24 and 489.

In the preferred embodiment, the first valve seat 28 is shown as an integrally formed annular end wall at the free end 24 of tower 22. A protruding first collar 62 is formed about the periphery of first opening 30 and protrudes toward the first valve member 32 which is formed with a first collar receiving channel 64 of a size and position for receiving the first collar 62 in fluid tight relation when the first valve member 32 is in its valve closed position of FIG. 4. The first collar 62 is preferably triangular in cross section or at least includes a tapered peripheral edge for a fluid tight sealed engagement within the collar receiving channel 64 which has a matching taper.

In the illustrated embodiment, the first and second valve members 32 and 46 are of identical construction, as shown best in FIG. 3. Each valve member includes a cylindrical base 66 having an outer circumference designed for free sliding movement within either the tower 22 or tubular valve body 36. Each sidewall tapers slightly forwardly of the base 66 to provide a plurality of axially extended arcuate fingers 68 having slots 70 between them to enable fluid flow through the valve member when in its valve open position. The free ends of the fingers support an annular plug 72 having an exterior face 74 in which the collar receiving channel 64 is formed. The valve actuator 58 or 60 is preferably integrally formed with and extends axially and centrally from the plug 72. In FIGS. 4 and 5, it is seen that the generally frustoconical tapering shoulder 76 between the cylindrical base 66 and finger 68 is of a size and shape for mating engagement with a similarly tapered interior shoulder 78 within tower 22 and tubular valve body 36. It is apparent that in an alternate embodiment, the first collar could be provided on the plug 72 and the first collar receiving channel 64 could be provided in the annular end wall 61 for a similar but reversed valving action between each valve seat 28 and the associated valve member 32. Each valve member and associated valve seat are preferably formed of a material which is somewhat rigid and durable and yet effective to form a fluid tight seal. A plastic such as propylene has proven to be an acceptable material. It is resistant to both wear and chemical erosion, thereby avoiding the problems associated with O-ring seals in known couplings.

Referring to the valve actuator stems 68 and 60, the illustrated embodiment shows these stems as being of equal length. In an alternate embodiment, the length of the valve actuator stem 60 of the female coupling member 18 could be increased or doubled and the valve stem 58 of the male coupling member 16 could be shortened or eliminated and simply provided as a contact pad.

Another advantageous feature is to provide a slightly stronger compression spring 48 for the female coupling member which would be connected to the supply hose 12 and a slightly weaker compression spring 34 for the male coupling member 16 which would preferably be disposable with the bottle or container onto which it is mounted. Accordingly, upon coupling of the male and female coupling members 16 and 18, the first valve member 32 of the male coupling member will open first and remain open longer. Upon uncoupling, the stronger spring in the female coupling member 18 will cause its second valve member 46 to close first, assuring that any drippage in the coupling between valve members 32 and 46 will drain into bottle 14 by gravity before the valve member 32 of the male coupling member 16 closes.

Referring to FIGS. 4 and 5, it is preferred that the tower have a slightly tapering frustoconical exterior surface 80 of an inclination to match the slightly tapering frustoconical interior surface 82 of valve body 36 for a secure fluid tight engagement between them in the coupled position of the male and female coupling members 16 and 18 as shown in FIG. 5. A single O-ring may be provided in an annular recess 86 at the juncture between the free end 38 of the tubular valve body and the tower receiving sleeve 54. That O-ring 84 is provided to seal out gases from entering the flow of liquid through the coupling. An effective liquid seal is afforded by the engagement of the free end 24 of tower 22 with the free end 38 of valve body 36. That flush engagement is assured by the stability imparted to the coupling members by the long matching tapered surfaces of the tower 22 and tower receiving sleeve 54. Those surfaces need not be interrupted by the type of annular recesses required for effecting O-ring seals between such members as in known quick connect couplings.

The elimination of O-rings from the male coupling member 16 is additionally important for economic reasons, since the male coupling member is most likely to be provided as a disposable part permanently attached to a disposable bottle or container. By reducing the number of O-rings to one, and positioning that )-ring on the reusable female coupling member 18, cost efficiency is built into the coupling.

To secure the male coupling member 16 and female coupling member 18 together in their coupled positions, the exterior surface 80 of the tower has one or more, and preferably a pair of oppositely situated, exteriorly facing lock sockets 88 formed therein. Likewise, the tower receiving sleeve 54 of the female coupling member 18 has a pair of oppositely situated lock slots 90 positioned for registration with the lock sockets 88 upon insertion of the tower 22 to its couple position. A lock member 92, preferably in the form of an arcuate key having an exterior facing flanged head 94, as shown best in FIG. 3, is situated in each lock slot 90 for movement between the lock position shown in FIG. 5 wherein the key 92 protrudes into the lock socket 88, in an unlocked position as shown in FIG. 4 wherein the keys protrude exteriorly of the tower receiving sleeve 54 so as to enable insertion and withdrawal of the tower 22. The flanged heads 94 prevent the keys from dropping through the lock slots 90 upon withdrawal of the tower 22. The locking sleeve 96 surrounds the tower receiving sleeve 54 and is axially slidable between the locked position shown in FIG. 5 and the unlocked position shown in FIG. 4. The free end of locking sleeve 96 has a relatively large interior diameter portion 98 for sliding movement on an exterior annular flange 100 on the end of the tower receiving sleeve 54. That relatively large diameter also affords sufficient clearance from the tower receiving sleeve 54 in its unlocked position that the locking keys 92 can be moved to their unlocked positions. That large diameter portion 98 is connected by an interior tapering shoulder 102 to a reduced diameter cylindrical portion 104 which, when registered with the locking keys 92, secures them in their locked positions. The remainder of the locking sleeve 96 is designed to match the exterior of the tower receiving sleeve 54 when the locking sleeve is in its locked position of FIG. 5. The opposite end of the locking sleeve is slotted at 106 as shown best at FIG. 3 to define a pair of oppositely situated flexible fingers 108 which terminate in an exterior flange 110. Referring to FIGS. 4 and 5, these flanges on fingers 108 are receivable within an annular interior socket 112 on connector 50 to accommodate movement of locking sleeve 96 to the unlocked position when the fingers 108 are compressed together. These same fingers 108 are effective to prevent accidental sliding movement of the locking sleeve 96 from its locked position. As shown in FIG. 5, the exterior flanges 110 on fingers 108 abut against the ends of the peripheral sidewall 114 of connector 50 when they are not being manually compressed together. The resilience of the fingers biases them to the positions in alignment with the remainder of the locking sleeve until they are manually compressed together by an operator.

If one can see the exterior flange 110 on the end of a finger 108, that affords a visual indication that the locking sleeve 96 is in its locked position since that exterior flange is not visible when the locking sleeve is slid within the connector 50 when moved to its unlocked position. A further visual indication could be provided by painting the exterior surface of the exterior annular flange 100 red or another bright color that would be prominently displayed when the locking sleeve is moved to its unlocked position. That bright surface would be concealed when the locking sleeve 96 is slid to its locking position of FIG. 5.

The second connector 50 on the connected end 40 of tubular valve body 36 is secured in place by coacting screw threads 116 and 118 on the connector 50 and valve body 36 respectively. An annular flange 120 connects side wall 114 to the threaded insert 122 and a hose barb insert 124 extends axially from the threaded insert for attachment to the supply hose 12 shown in FIGS. 1 and 2, for example. Connector 50 is replaceable to provide any type of universal connection to any type of fluid conduit or container. For example, an elbow hose barb insert could be provided to eliminate bending of a hose attached thereto. Alternately, a male pipe thread insert could replace the hose barb insert 124 for connection to a pipe. Still further, the connector could be integrally formed with a bottle cap similar to cap 20 if it is desired to have the female coupling member 18 associated with the cap. It is generally desirable, however, to have the male coupling member 16 connected to the bottle because it is the simpler of the coupling members and may be provided as a disposable item. As an alternative to having the male coupling member integrally formed with a bottle cap 20 as illustrated, the male coupling member 16 could have the connector thereof be a throat plug for insertion, preferably permanently, into the neck of a bottle. The point is that the connector portion of each coupling member may be as varied as fluid conduits and containers are to accommodate attachment to any of them.

To afford venting of gas into or from the bottle 14 due to pressure differentials relative to the ambient atmosphere exteriorly of the bottle, cap 20 includes a vent system. First, cap 20 has a top wall 126 having a top wall opening 128 registered with the tower 22 in the illustrated embodiment or to the tubular valve body 36 in an alternate embodiment. The peripheral side wall 130 of cap 20 is provided with threads 132 or other suitable fasteners for connection to the neck of a bottle 14 or the collar surrounding the opening of any other fluid container. The vent system includes a flow control insert 134 and an annular seal member 136 sandwiched between the flow control insert 134 and cap top wall 126 as shown in FIGS. 4 and 5. The flow control insert 134 has a base portion 138 and a raised flow control portion 140 adapted for insertion through the top wall opening 128. Appropriate barbs 142 and notches 144 may be provided on the flow control portion 140 and within the tower 22 to secure the flow control insert 134 in place. It could alternately be glued or otherwise mechanically secured. Base 138 has a raised peripheral flange 146 and at least one, and preferably several, vent holes 148. Those vent holes 148 may be enlarged as at 150 on the side facing seal member 136 to optimize exposure to the seal member. The raised peripheral flange 146 pinches the seal member 136. The seal member 136 is preferably formed of a material which enables flow of gas therethrough but prevents liquid flow. One current example is GORTEX material but as technology develops in this field, such improved materials will be incorporated for seal member 136. Vent holes 152 would be provided through the cap top wall 126 at positions interiorly of the raised peripheral flange 146 of the flow control insert. As a result, either positive or negative pressure differentials within a container can be vented through the flow control insert vent holes 148, seal member 136 and cap top wall vent holes 152. The venting function may be eliminated or disabled by eliminating or closing the vent holes in either or both of the flow control insert and cap top wall.

The vent system could alternately be constructed as described in applicant's U.S. Pat. No. 5,165,578 wherein the seal member would have a small opening therethrough of a size to permit passage of gas but not liquid.

Figure 6:
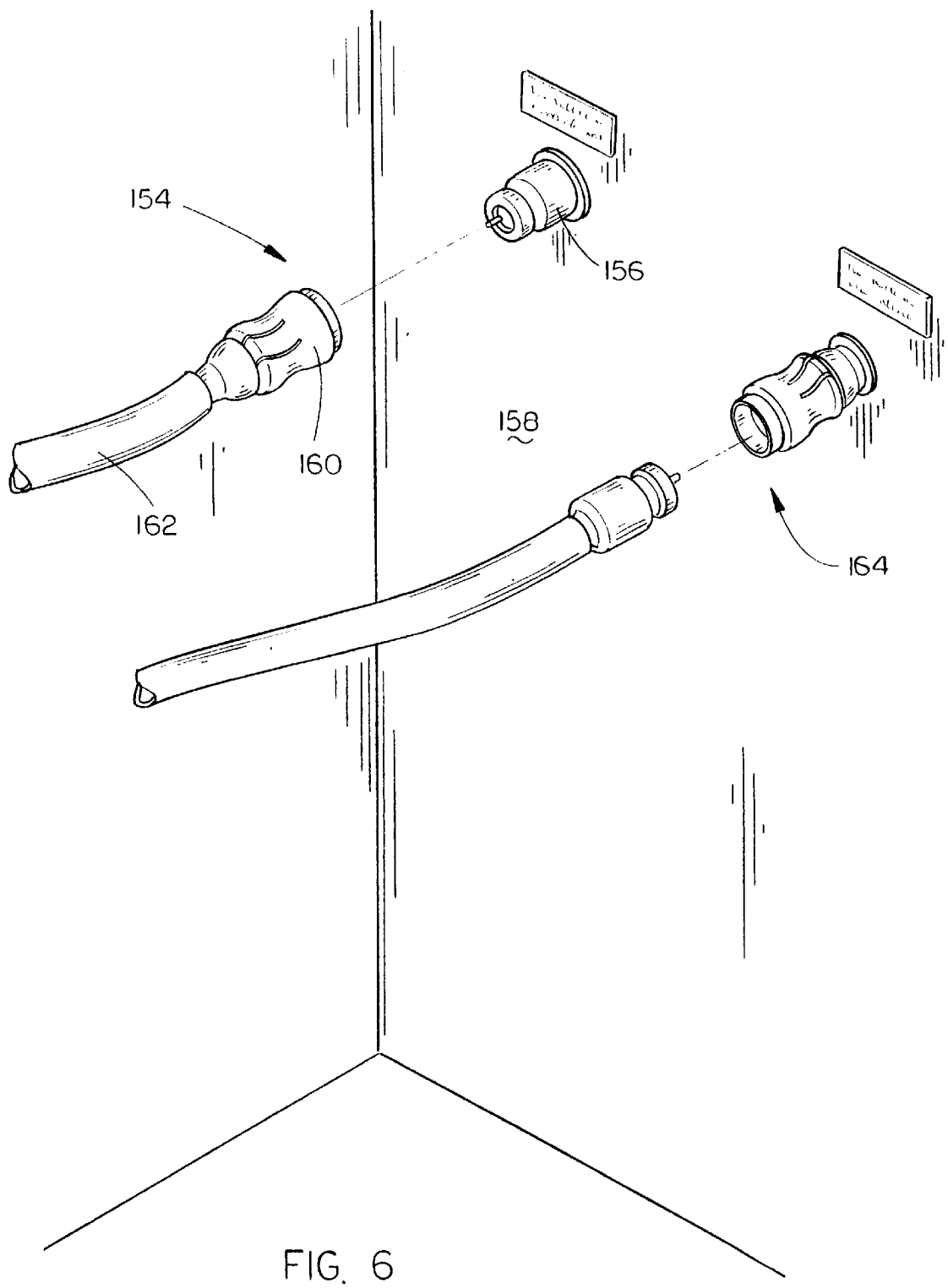
FIG. 6 is a perspective view of a pair of vented quick disconnect couplings having respective male and female coupling members thereof connected to a wall panel.

FIG. 6 illustrates the versatility of the vented quick disconnect coupling of the invention. The upper coupling 154 includes a male coupling member 156 with a bulkhead panel mount connector for securing it to wall panel 158 and a female coupling member 160 connected to a supply hose 162. The lower coupling 164 is oppositely configured with the female coupling member mounted on the wall 158 and the male coupling member secured to supply hose 162.

Whereas the vented quick disconnect coupling 10 has been shown and described in connection with preferred embodiments thereof, it is apparent that many modification, additions and substitutions may be mad which are within the intended broad scope of the appended claims.

I claim:

1. A vented quick disconnect coupling for coupling first and second fluid carriers comprising:
   a male coupling member including,
      a generally tubular tower having a free end and a connected end,
      a first valve seat adjacent said free end of said tower and defining a first opening for fluid flow therethrough,
      a first valve member reciprocally movable within said tower between a valve closed position in engagement with said first valve seat wherein fluid flow through said first opening is blocked and a valve open position in spaced relation from said first valve seat whereby fluid is free to flow through first said opening,
      a first biasing apparatus in said tower urging said first valve member to the valve closed position thereof,
      a first connector on the connected end of said tubular tower and operative to connect said tubular tower to a first fluid carrier for fluid flow therebetween,
   a female coupling member including,
      a tubular valve body having a free end and a connected end,
      a second valve seat adjacent said free end of said valve body and defining a second opening for fluid flow therethrough,
      a second valve member reciprocally movable within said valve body between a valve closed position in engagement with said second valve seat wherein fluid flow through said second opening is blocked, and a valve open position in spaced relation from said second valve seat whereby fluid is free to flow through said second opening,
      a second biasing apparatus in said valve member urging said second valve member to the valve closed position thereof,
      a second connector on the connected end of said tubular valve body and operative to connect said tubular valve body to a second fluid carrier for fluid flow therebetween, a tower receiving sleeve protruding from the free end of said tubular valve body, said sleeve defining an interior socket of a size and shape for receiving said tubular tower of said male coupling member to a substantially fluid tight coupled position, co-acting first and second valve actuators on said first and second valve members, respectively, and positioned for extension through said first and second openings for mutual engagement, the combined length of said actuators being such that, upon receipt of said tubular tower into said valve body to the coupled position thereof, both of the first and second valve members are moved to the valve open positions thereof against the urging of said first and second biasing apparatus, respectively, and at least one of said male and female coupling members including a vent system operative, upon connection of said one coupling member to a fluid carrier, to vent gas between said fluid carrier and the ambient atmosphere.

2. The vented quick disconnect coupling of claim 1 wherein one of said first valve seat and first valve member includes a protruding first collar and the other of said first valve seat and first valve member includes a first collar receiving channel of a size and position for receiving said first collar in fluid tight relation upon movement of said first valve member to the valve closed position thereof.

3. The vented quick disconnect coupling of claim 2 wherein said first protruding collar is on said first valve seat and said first collar receiving channel is on said first valve member.

4. The vented quick disconnect coupling of claim 3 wherein said first protruding collar and said collar receiving channel are both circular.

5. The vented quick disconnect coupling of claim 2 wherein one of said second valve seat and second valve member includes a second protruding collar and the other of said second valve seat and second valve member includes a second collar receiving channel of a size and position for receiving said second collar in fluid tight relation upon movement of said second valve member to the valve closed position thereof.

6. The vented quick disconnect coupling of claim 5 wherein said second protruding collar is on said second valve seat and said second collar receiving channel is on said second valve member.

7. The vented quick disconnect coupling of claim 6 wherein said second protruding collar and said collar receiving channel are both circular.

8. The vented quick disconnect coupling of claim 5 wherein said first and second valve members are of a size and shape to close said first and second openings, respectively, upon movement to the valve closed positions and to provide for fluid flow through said respective tubular tower and valve body upon movement to the respective valve open positions.

9. The vented quick disconnect coupling of claim 5 wherein said first and second connectors are each selected from the group consisting of an inline hose barb fitting, a bulkhead panel mount hose barb fitting, a male pipe thread fitting, and a bottle cap.

10. The vented quick disconnect coupling of claim 5 wherein said first and second biasing apparatus each comprise a compression spring.

11. The vented quick disconnect coupling of claim 10 wherein the compression spring of said female coupling member is at last slightly stronger than the compression spring of said male coupling member.

12. A vented quick disconnect coupling for coupling first and second fluid carriers, comprising:

a male coupling member including,
a generally tubular tower having a free end and a connected end,
a first valve seat adjacent said free end of said tower and defining a first opening for fluid flow therethrough,
a first valve member reciprocally movable within said tower between a valve closed position in engagement with said first valve seat wherein fluid flow through said first opening is blocked, and a valve open position in spaced relation from said first valve seat whereby fluid is free to flow through said first opening,
a first biasing apparatus in said tower urging said first valve member to the valve closed position thereof,
a first connector on the connected end of said tubular tower and operative to connect said tubular tower to a first fluid carrier for fluid flow therebetween;

a female coupling member including,
a tubular valve body having a free end and a connected end,
a second valve seat adjacent said free end of said valve body and defining a second opening for fluid flow therethrough,
a second valve member reciprocally movable within said valve body between a valve closed position in engagement with said second valve seat wherein fluid flow through said second opening is blocked, and a valve open position in spaced relation from said second valve seat whereby fluid is free to flow through said second opening,
a second biasing apparatus in said valve member urging said second valve member to the valve closed position thereof,
a second connector on the connected end of said tubular valve body and operative to connect said tubular valve body to a second fluid carrier for fluid flow therebetween;
a tower receiving sleeve protruding from the free end of said tubular valve body, said sleeve defining an interior socket of a size and shape for receiving said tubular tower of said male coupling member to a substantially fluid tight coupled position;

co-acting first and second valve actuators on said first and second valve members, respectively, and positioned for extension through said first and second openings for mutual engagement, the combined length of said actuators being such that, upon receipt of said tubular tower into said valve body to the coupled position thereof, both of the first and second valve members are moved to the valve open positions thereof against the urging of said first and second biasing apparatus, respectively;

at least one of said male and female coupling members including a vent system operative, upon connection of said one coupling member to a fluid carrier, to vent gas between said fluid carrier and the ambient atmosphere;

said tubular tower of said male coupling member further comprising an exteriorly facing lock socket in said peripheral sidewall;

said female coupling member further comprising,
a lock slot through said tower receiving sleeve at a position for registration with said lock socket upon receipt of said tubular tower to the coupled position thereof, a lock member in said lock slot and movable between a lock position protruding interiorly of said tower receiving sleeve for receipt within said lock socket and an unlocked position protruding exteriorly of said tower receiving sleeve, and a locking sleeve surrounding said tower receiving sleeve and being axially slidable between locked and unlocked positions, said locking sleeve having a reduced diameter portion registered with said lock member in the locked position of said locking sleeve for securing said lock member in the lock position, and an enlarged diameter portion registered with said lock member in the unlocked position of said locking sleeve for enabling movement of the lock member to the unlocked position thereof.

13. The vented quick disconnect coupling of claim 12 wherein said lock socket is one of two oppositely situated first and second lock sockets in said peripheral sidewall of said tubular tower; said lock slot likewise being one oppositely situated first and second lock slots on said female coupling member, and said lock member being one of first and second lock members in said first and second lock slots.

14. The vented quick disconnect coupling of claim 13 wherein said first and second lock members comprise arcuate keys.

15. The vented quick disconnect coupling of claim 14 wherein said seal is formed of GORTEX material.

16. A vented quick disconnect coupling for coupling first and second fluid carriers, comprising:

a male coupling member including, a generally tubular tower having a free end and a connected end, a first valve seat adjacent said free end of said tower and defining a first opening for fluid flow therethrough, a first valve member reciprocally movable within said tower between a valve closed position in engagement with said first valve seat wherein fluid flow through said first opening is blocked, and a valve open position in spaced relation from said first valve seat whereby fluid is free to flow through said first opening, a first biasing apparatus in said tower urging said first valve member to the valve closed position thereof, a first connector on the connected end of said tubular tower and operative to connect said tubular tower to a first fluid carrier for fluid flow therebetween;

a female coupling member including, a tubular valve body having a free end and a connected end, a second valve seat adjacent said free end of said valve body and defining a second opening for fluid flow therethrough, a second valve member reciprocally movable within said valve body between a valve closed position in engagement with said second valve seat wherein fluid flow through said second opening is blocked, and a valve open position in spaced relation from said second valve seat whereby fluid is free to flow through said second opening, a second biasing apparatus in said valve member urging said second valve member to the valve closed position thereof, a second connector on the connected end of said tubular valve body and operative to connect said tubular valve body to a second fluid carrier for fluid flow therebetween;

a tower receiving sleeve protruding from the free end of said tubular valve body, said sleeve defining an interior socket of a size and shape for receiving said tubular tower of said male coupling member to a substantially fluid tight coupled position;

co-acting first and second valve actuators on said first and second valve members, respectively, and positioned for extension through said first and second openings for mutual engagement, the combined length of said actuators being such that, upon receipt of said tubular tower into said valve body to the coupled position thereof, both of the first and second valve members are moved to the valve open positions thereof against the urging of said first and second biasing apparatus, respectively;

at least one of said male and female coupling members including a vent system operative, upon connection of said one coupling member to a fluid carrier, to vent gas between said fluid carrier and the ambient atmosphere;

one of said first and second connectors comprising a container cap having a top wall with a top wall opening registered with a respective one of said tubular tower and tubular valve body for fluid flow therebetween, and a peripheral sidewall having an attachment mechanism for attaching said cap to a container, and said vent system comprising:

a liquid flow control insert comprising a base portion and a raised flow control portion adapted for insertion through said top wall opening, said base portion including a raised peripheral flange and at least one vent hole in said base portion;

a generally annular seal between said cap and said flow control insert, said seal being operative to allow gas to pass therethrough but to prevent liquid flow therethrough;

said top wall having at least one vent opening therethrough positioned for registration with said annular seal whereby gas, but not liquid, can pass through said vent openings and annular seal between the atmosphere and a container onto which said cap is secured.

17. The quick disconnect coupling of claim 16 wherein at least one of said male and female coupling members includes a vent system operative, upon connection of said one coupling member to a fluid carrier, to vent gas between said fluid carrier and the ambient atmosphere.

18. A quick disconnect coupling for coupling first and second fluid carriers, comprising:

a male coupling member including, a generally tubular tower having a free end and a connected end, a first valve seat adjacent said free end of said tower and defining a first opening for fluid flow therethrough, a first valve member reciprocally movable within said tower between a valve closed position in engagement with said first valve seat wherein fluid flow through said first opening is blocked, and a valve open position in spaced relation from said first valve seat whereby fluid is free to flow through said first opening, a first biasing apparatus in said tower urging said first valve member to the valve closed position thereof, a first connector on the connected end of said tubular tower and operative to connect said tubular tower to a first fluid carrier for fluid flow therebetween;

a female coupling member including,
- a tubular valve body having a free end and a connected end,
- a second valve seat adjacent said free end of said valve body and defining a second opening for fluid flow therethrough,
- a second valve member reciprocally movable within said valve body between a valve closed position in engagement with said second valve seat wherein fluid flow through said second opening is blocked, and a valve open position in spaced relation from said second valve seat whereby fluid is free to flow through said second opening,
- a second biasing apparatus in said valve member urging said second valve member to the valve closed position thereof,
- a second connector on the connected end of said tubular valve body and operative to connect said tubular valve body to a second fluid carrier for fluid flow therebetween;
- a tower receiving sleeve protruding from the free end of said tubular valve body, said sleeve defining an interior socket of a size and shape for receiving said tubular tower of said male coupling member to a substantially fluid tight coupled position;

co-acting first and second valve actuators on said first and second valve members, respectively, and positioned for extension through said first and second openings for mutual engagement, the combined length of said actuators being such that, upon receipt of said tubular tower into said valve body to the coupled position thereof, both of the first and second valve members are moved to the valve open positions thereof against the urging of said first and second biasing apparatus, respectively;

said tubular tower of said male coupling member further comprising a peripheral sidewall and an exteriorly facing lock socket in said peripheral sidewall;

said female coupling member further comprising,
- a lock slot through said tower receiving sleeve at a position for registration with said lock socket upon receipt of said tubular tower to the coupled position thereof,
- a lock member in said lock slot and movable between a lock position protruding interiorly of said tower receiving sleeve for receipt within said lock socket and an unlocked position protruding exteriorly of said tower receiving sleeve, and
- a locking sleeve surrounding said tower receiving sleeve and being axially slidable between locked and unlocked positions, said locking sleeve having a reduced diameter portion registered with said lock member in the locked position of said locking sleeve for securing said lock member in the lock position, and an enlarged diameter portion registered with said lock member in the unlocked position of said locking sleeve for enabling movement of the lock member to the unlocked position thereof.

* * * * *